(12) United States Patent
Wing

(10) Patent No.: US 7,810,855 B2
(45) Date of Patent: *Oct. 12, 2010

(54) BIDIRECTIONAL SLIDE LOCK AND METHOD OF USING SAME

(75) Inventor: Forrest F. Wing, Des Moines, IA (US)

(73) Assignee: Maytag Corporation, Benton Harbor, MI (US)

(*) Notice: Subject to any disclaimer, the term of this patent is extended or adjusted under 35 U.S.C. 154(b) by 1 day.

This patent is subject to a terminal disclaimer.

(21) Appl. No.: 11/289,073

(22) Filed: Nov. 29, 2005

(65) Prior Publication Data

US 2006/0138783 A1    Jun. 29, 2006

(51) Int. Cl.
*E05C 19/00* (2006.01)

(52) U.S. Cl. .................................. 292/302; 292/336.3

(58) Field of Classification Search ................ 292/302, 292/DIG. 71; 16/110.1, 412; 24/289–295, 24/297; 403/331; 248/221.11, 222.11, 222.12; 312/405, 326–329
See application file for complete search history.

(56) References Cited

U.S. PATENT DOCUMENTS

| 965,658 | A | | 7/1910 | Reubel |
|---|---|---|---|---|
| 2,200,158 | A | * | 5/1940 | Clarke ...................... 403/404 |
| 2,731,662 | A | | 1/1956 | Mills |
| 2,994,888 | A | | 8/1961 | Egidio |
| 3,098,686 | A | | 7/1963 | Benoit |
| 3,338,649 | A | | 8/1967 | Stewart |
| 3,340,563 | A | | 9/1967 | Parsons et al. |
| 3,548,425 | A | | 12/1970 | Goldstein |
| 3,862,506 | A | | 1/1975 | Drenten |
| 3,928,894 | A | * | 12/1975 | Bury et al. .................. 248/467 |
| 3,995,349 | A | * | 12/1976 | Roberts et al. ................ 16/412 |
| 4,087,141 | A | * | 5/1978 | Roberts .................... 312/348.6 |
| 4,090,757 | A | | 5/1978 | Frey et al. |
| 4,113,217 | A | * | 9/1978 | O'Connell .............. 248/222.11 |
| 4,153,314 | A | * | 5/1979 | Prater ...................... 312/348.6 |
| 4,332,052 | A | * | 6/1982 | Remington .................... 16/30 |
| 4,422,212 | A | | 12/1983 | Sheiman et al. |
| 4,484,788 | A | * | 11/1984 | L'Homme et al. ........ 312/348.6 |
| 4,645,228 | A | * | 2/1987 | Bertonneau ................. 280/603 |

(Continued)

OTHER PUBLICATIONS

"retain", merriam-websters online dictionary, http://www.m-w.com/, Apr. 30, 2007.*

*Primary Examiner*—Peter M Cuomo
*Assistant Examiner*—Kristina R Fulton
(74) *Attorney, Agent, or Firm*—John W. Morrison; McKee, Voorhees & Sease P.L.C.

(57) ABSTRACT

A bidirectional slide lock includes a first clip and a second clip that are slid and locked together. The first clip has a longitudinal axis, a pair of pawls, and a pair of flanges. The second clip has a longitudinal axis, a pair of pawl stops, and a pair of clip flanges. Both pair of flanges retentively engaging one another to hold the clips together to prevent movement away from one another. The pawls engage the pawl stops to hold clips against longitudinal movement. The bidirectional slide lock also has springs biasing the pawls toward the second clip so as to retain pawls in retentive engagement with the pawl stops. The method of use includes moving the first and second clips longitudinally relative to one another so that the flanges move into retentive engagement and cause each of the pawl ends to engage one of the pawl stops.

17 Claims, 4 Drawing Sheets

U.S. PATENT DOCUMENTS

| | | | |
|---|---|---|---|
| 4,745,656 A * | 5/1988 | Revlett | 16/412 |
| 5,175,907 A * | 1/1993 | Baumgarten | 220/752 |
| 5,303,445 A | 4/1994 | Meyers | |
| 5,373,608 A * | 12/1994 | Welch | 16/425 |
| 5,402,553 A * | 4/1995 | Goetz et al. | 16/413 |
| 5,440,783 A * | 8/1995 | Allardyce et al. | 16/110.1 |
| 5,524,394 A * | 6/1996 | Szabo et al. | 52/36.1 |
| 5,653,550 A | 8/1997 | Mutz et al. | |
| 6,094,866 A | 8/2000 | Busnelli | |
| 6,223,471 B1 | 5/2001 | Barber | |
| 6,557,956 B2 | 5/2003 | Hightower | |
| 6,722,722 B1 | 4/2004 | Sturt et al. | |
| 6,908,274 B1 * | 6/2005 | Vassiliou | 411/437 |
| 6,959,480 B2 * | 11/2005 | Wing et al. | 29/525.02 |
| 7,090,426 B2 * | 8/2006 | Wing | 403/329 |
| 2003/0079313 A1 | 5/2003 | Pohl et al. | |
| 2003/0106185 A1 | 6/2003 | Worrell | |
| 2004/0094560 A1 * | 5/2004 | Gose et al. | 220/755 |

* cited by examiner

BIDIRECTIONAL SLIDE LOCK AND METHOD OF USING SAME

CROSS REFERENCE TO RELATED APPLICATION

This application claims priority to U.S. application Ser. No. 10/755,751 filed Jan. 12, 2004, hereby incorporated by reference in their entirety.

BACKGROUND OF THE INVENTION

The present invention relates to a bidirectional slide lock and method of using same.

Parts and clips are used for surface mounting handles and decorative trim. The typical fastener for mounting handles and decorative trim locks in only one direction. Therefore, at least two locks are required to mount a handle or a piece of decorative trim.

On occasion, the need arises to mount a handle with only one device centrally located. These occasions may arise when a handle cannot accommodate two fasteners because of size limitations. In addition, a handle or decorative trim may be more easily reversible if it has one centrally located symmetrical fastener as opposed to two fasteners located at the extremities of the handle. Furthermore, a user may wish to centrally locate a fastener to facilitate a variety of different designs that would be unable to be accommodated by two fasteners located at the extremities.

Accordingly, there is a need for a single fastener than can individually hold a handle or a piece of decorative trim to a refrigerator or other body. Therefore a primary objective of the present invention is the provision of a fastener than can be slid into place and locked in two directions so that it cannot be removed without the use of tools.

A further objective of the present invention is the provision of a fastener which can be reversed from an upright position to an upside down position.

A further objective of the present invention is the provision of a fastener that does not require more than a centrally located screw to fasten the handle in place.

A still further objective of the present invention is the ability to easily remove the handle from the door using a tool.

A further objective of the present invention is the provision of a fastener which is symmetrical and therefore easily reversible.

A further objective of the present invention is the provision of a fastener which is relatively inexpensive to manufacture efficient in use, and simple in operation

BRIEF SUMMARY OF THE INVENTION

The foregoing objectives may be achieved with a bidirectional slide lock. The bidirectional slide lock includes a first clip and a second clip that are slid and locked together. The first and second clips have flanges that retentively engage one another to hold the first and second clips together to prevent movement away from one another The first clip has a pair of pawls that retentively engage a pair of pawl stops upon the second clip and thereby hold the first and second clips against longitudinal movement relative to one another. The bidirectional slide lock also has a pair of springs biasing the pair of pawls toward the second clip so as to retain the pawls in retentive engagement with the pawl stops.

The foregoing objectives may also be achieved with a method of using bidirectional slide lock The method including the step moving the first and second clips longitudinally relative to one another so that the first clip flanges move into retentive engagement with the second clip flanges and hold the first and second clips against movement toward and away from one another. The method also including the step causing each of the pawls to engage one of the pawl stops so as to prevent further longitudinal movement of the first clip relative to the second clip.

DETAILED DESCRIPTION OF THE PREFERRED EMBODIMENT

Figure 1:
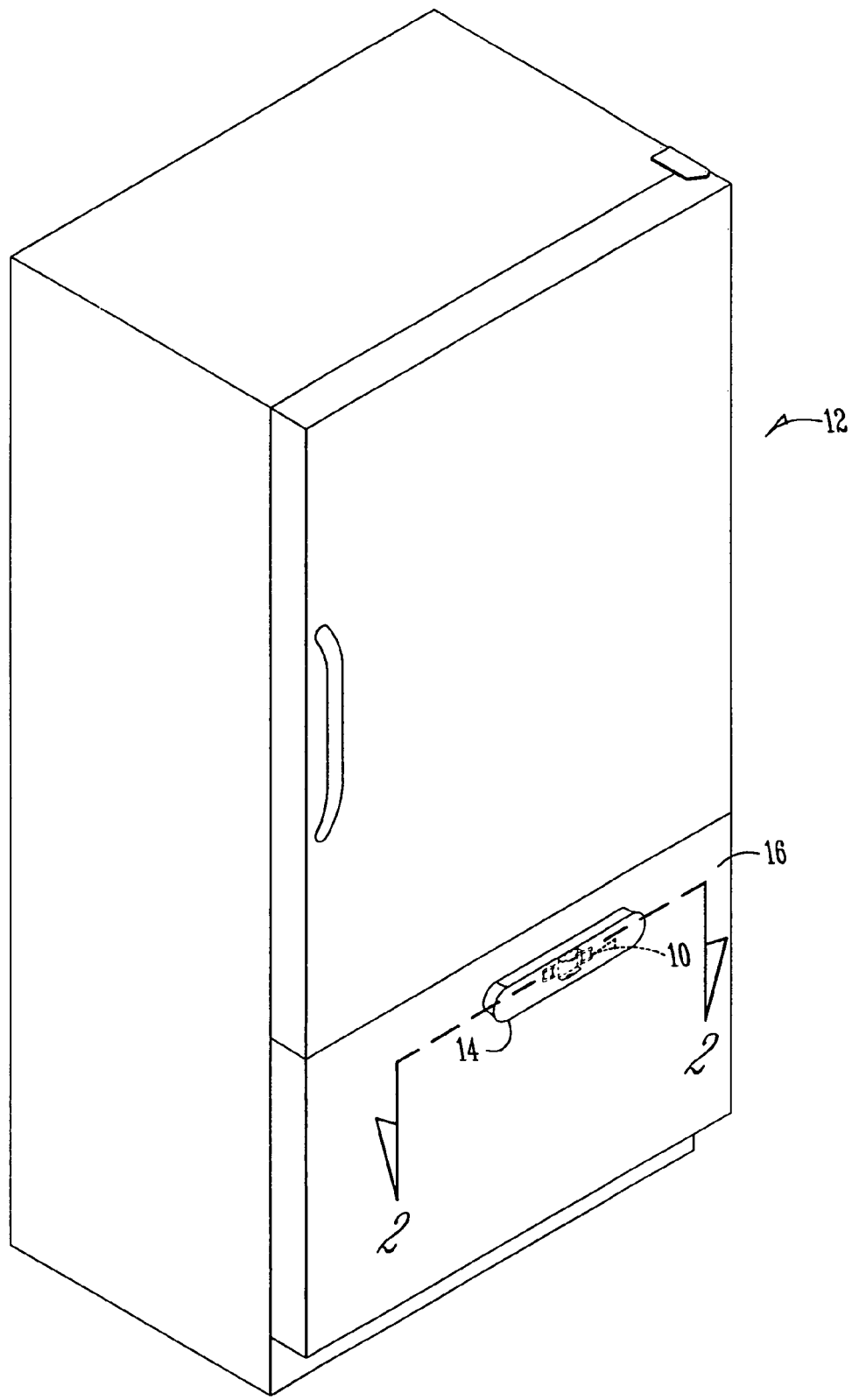
FIG. 1 is a perspective view showing the bidirectional slide lock of the present invention in use upon a refrigerator.

The numeral 10 generally designates a bidirectional slide lock of the present invention. The bidirectional slide lock 10 as illustrated in FIG. 1 is used with a refrigerator 12 to connect a handle 14 to a door 16.

Figure 2:
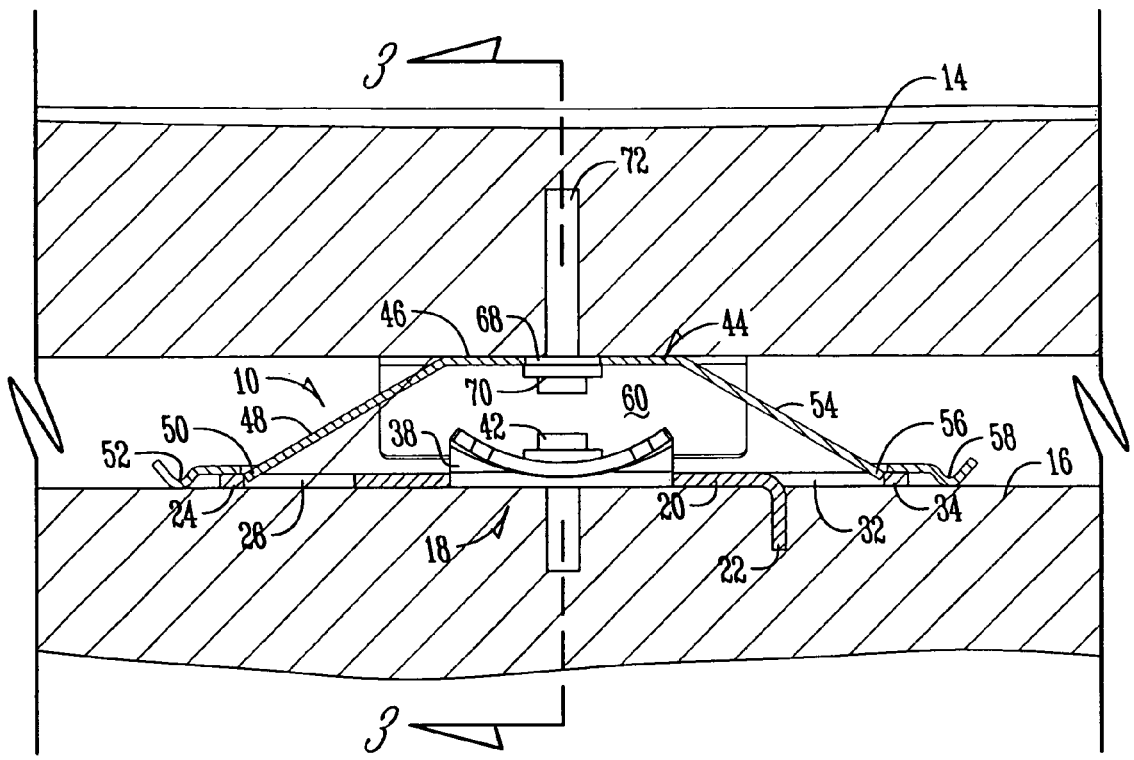
FIG. 2 is a sectional view taken along line 2-2 in FIG. 1 and shows the bidirectional slide lock in a locked position.
Figure 3:
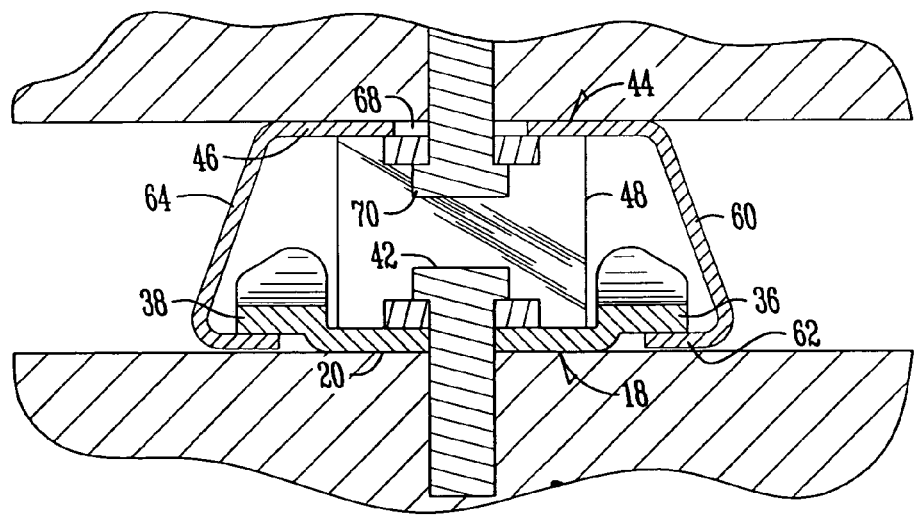
FIG. 3 is a sectional view taken along line 3-3 in FIG. 2 and shows the bidirectional slide lock in a locked position.
Figure 4:
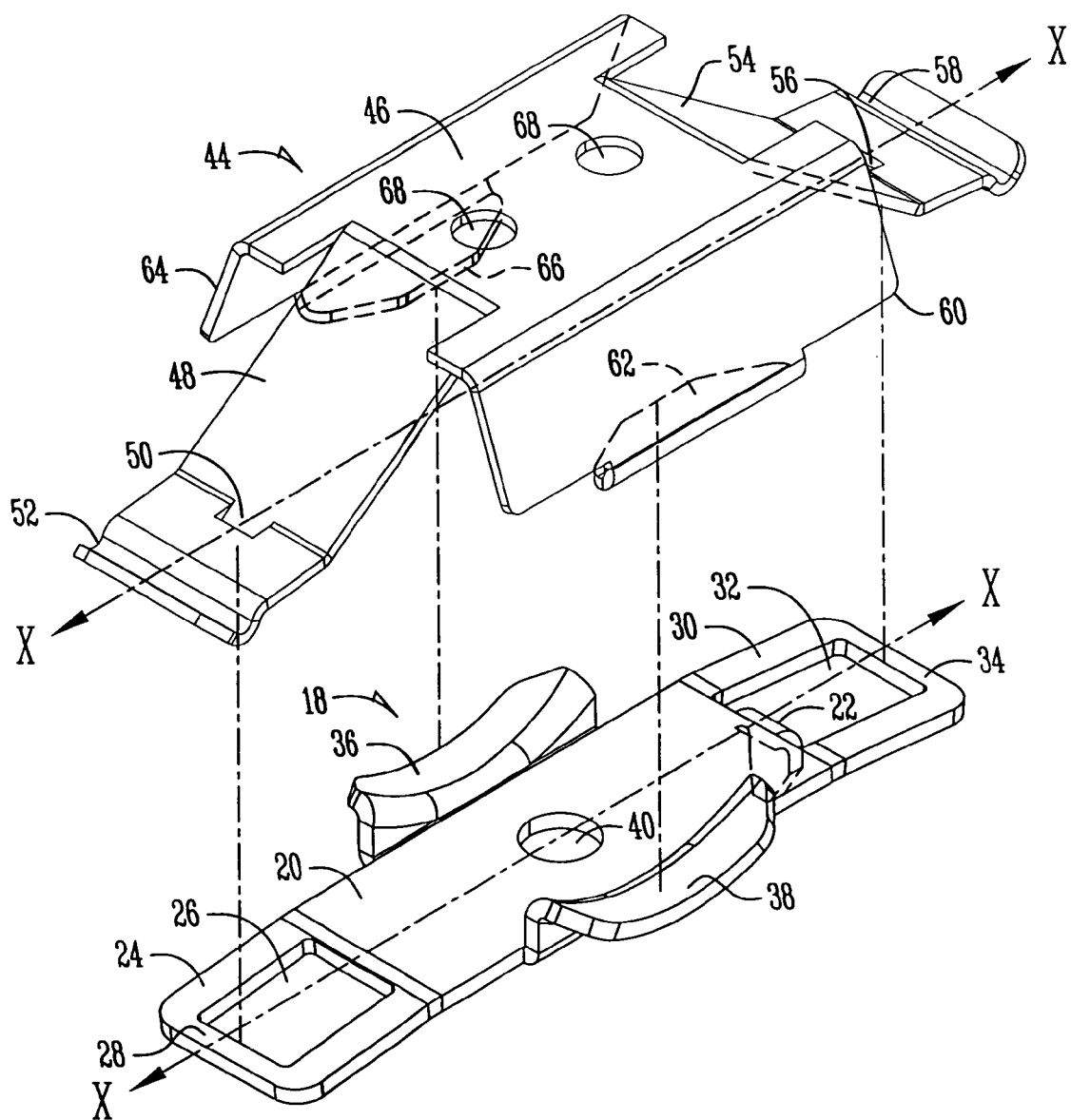
FIG. 4 is an exploded perspective view of the handle clip over the door clip showing in dashed lines the points of interaction and in dashed arrows the longitudinal axes.

As seen in FIGS. 2, 3, and 4, the door clip 18 has a door clip base 20. Attached to the door clip base is a leg 22 that prevents clocking or rotational movement of the door clip 18 and consequently also prevents rotational movement of the handle 14. The door clip 18 has a first wing 24 having a first hole 26 with an edge that defines a first pawl stop 28. The door clip 18 also has a second wing 30 having a second hole 32 with an edge that defines a second pawl stop 34. The door clip 18 has a first flange 36 and a second flange 38; these flanges 36, 38 are both a curved arc.

The pair of flanges 36, 38 together define a longitudinal axis of movement X. Tie pawl stops 28, 34 upon wings 24, 30 together are positioned to limit the travel along the longitudinal axis X in both directions.

The door clip 18 also has a screw hole 40 which accommodates a first screw 42. The first screw 42 cooperates with the leg 22 to prevent rotation of the bidirectional slide lock 10 and consequently prevents rotation of the handle 16 while the user is gripping the handle 16 to open the door 14. The use of first screw 42 and leg 22 eliminates the use of a receiving clip (not shown).

The handle clip 44 has a handle base 46. Attached to the handle base 46 is a first arm 48. The first arm 48 may have a first finger or first pawl 50 upon it and a first biasing member 52. A second arm 54 is also attached to the handle clip base 46 and has a second finger or second pawl 56 and a second biasing member 58 upon it. The arms 48, 54 are flexible and will move to position the fingers 50, 56 against the pawl stops 28, 34. The arm structures 48, 54 are typically made of resilient spring steel.

As seen in FIG. 2, the biasing members 52, 58 are designed to become flush with the door 16 surface and to press the pawls 50, 56 into the pawl stops 28, 34. The bias members 52, 58 also have a lip which permits removal of a finger 50, 56 from the pawl stop 28, 34 for removal of the handle 16 from the door 14. This removal is generally done by running a flat, knife like object (not shown) between the door handle interface to contact this lip and the lip pried away from the door 16.

As in FIG. 4, the handle clip 44 also has first and second handle clip flanges 60, 64 attached to the handle clip base 46. The first handle clip flange 60 has a first lip 62. The second handle clip flange 64 has a second lip 66. The lips 62, 66 are designed to engage door clip flanges 36, 38. The handle clip base 46 is attached to the handle 16 by screw 70 being placed through screw hole 68 and into screw receiving hole 72. As seen in FIG. 2, one screw 70 may be used to attach the handle clip 44 to the handle 14 or, as seen in FIG. 4, two screws may be used for this attachment A washer may be placed between the interface of the screw head and the handle clip base 46.

The door clip flanges 36, 38 are an inwardly curved arc. The inwardly curved arc design permits the lips 60, 62 to be easily fitted into cooperation with the door clip flanges 36, 38 and for tension to be increased as the lips 60, 62 are centered upon the flanges 36, 38. The lips 62, 66 are only slideable along a longitudinal axis of movement X once in contact with door clip flanges 36, 38.

Figure 5:
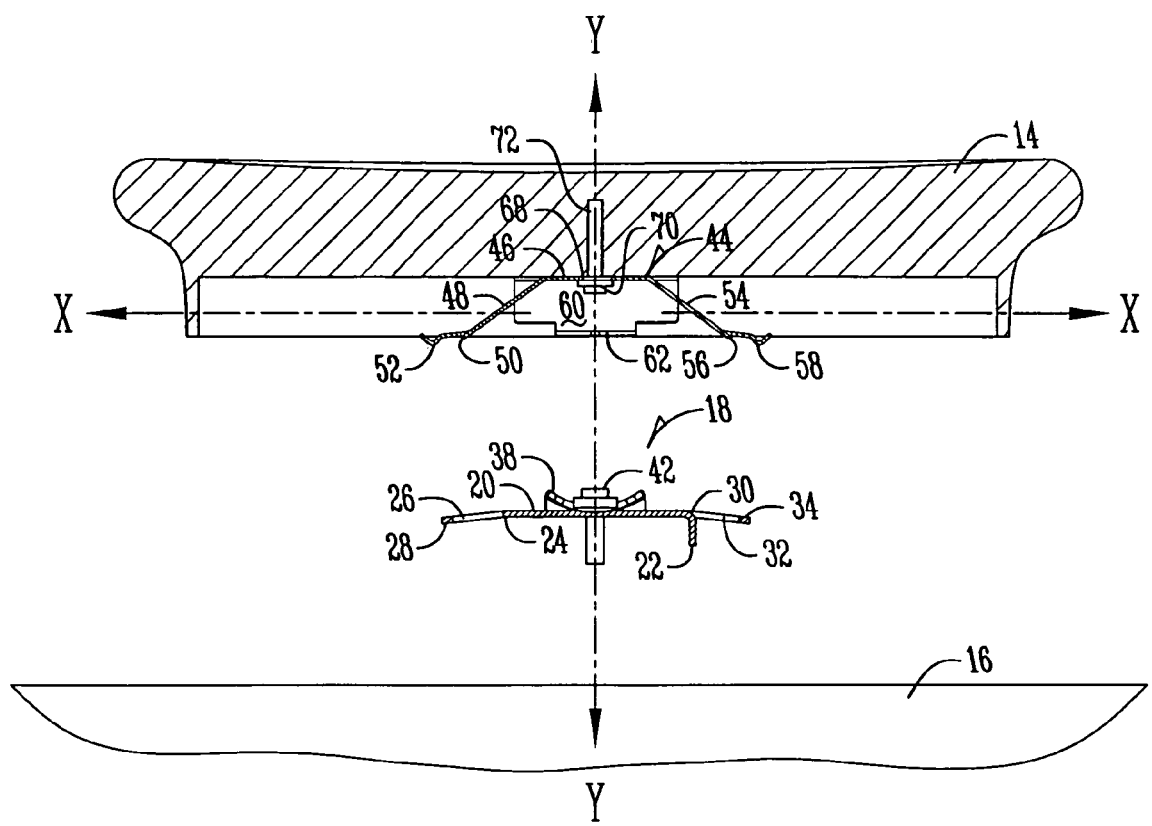
FIG. 5 is an exploded view of the door clip prior to being mounted upon the door and the handle clip mounted on the handle in position to be mounted upon the door.

In use, a handle or decorative piece of trim is provided for mounting to a door. As seen in FIG. 5, a handle clip 44 is attached to the handle 14 by a screw 70 being placed into a screw hole 68 and attached to the screw receiving hole 72 of a handle 14. The handle clip 44 is attached with the arms 48, 54 extending in a diagonal such that the pawls 50, 56 are flush with the underside of the handle 14 and the biasing members 52, 58 are extending slightly beyond the underside of the handle 14. In this position, the pawls 50, 56 and biasing member 52, 58 are positioned to bend and interact with the pawl stops 28, 34. The biasing members 52, 58 also provide the additional benefit of providing a positive feel to the handle clip 14 moving over the pawl stops 50, 56 so as to indicate to the user that the interconnection is properly being made.

As further seen in FIGS. 4 and 5, the door clip 18 and handle clip 44 each have a longitudinal axis X that is parallel with the other. The lateral axis Y illustrates the line along which the pieces travel to be placed together.

In its natural state, the door clip 18 has a slight bending downward of wings 24, 30. When fastened upon the door 16 the wings bend to conform with the surface of the door 16 as seen in FIG. 2 to create a tight, snug fit.

Once the door clip 18 is mounted upon the door 16, the handle is moved into position which is slightly off center the illustrated lateral axis Y to lips 62, 60 to move under the flanges 36, 38. Movement is only permitted along the longitudinal axis X.

The user slides the handle clip 44 by moving the handle 14 along the longitudinal axis until the handle clip 44 couples with the door clip 18 by having one pawl 50, 56 engage one pawl stop 28, 34. The user then presses slightly upon the one pawl stop to create a slight bend in the arm 48, 54 to then permit the other finger 50, 56 to be put into place against the other pawl stop 28, 34. Thus, by using both pawl stops 23, 34 the user limits the movement of the handle clip 44 along the axis of movement X in both a first direction and a second direction.

The user can remove the handle by placing a tool between the door surface and the handle surface and sliding it until it catches upon one of the biasing members 52, 58 and a slight upward movement releases either finger 50, 56 from the pawl stop 28, 34 so that the user can then slide the handle clip 44 toward the released finger to thus release the other finger from cooperation with the other pawl stop. Once the handle clip 44 is free of the door clip 18, the handle 14 can then be pulled away and separated from the door 16.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:

1. A door assembly, comprising:
   a door panel;
   a handle having opposite handle ends;
   a first clip on the door panel;
   a second clip positioned between the door panel and the handle;
   the first clip having a pair of first flanges and opposite first clip ends with a pair of pawl stops located at each of the opposite first clip ends;
   the second clip having a base with a pair of flexible arms inclining outwardly from the base in opposite directions to define opposite ends of the clip;
   the second clip being separate from and not integrally formed with the handle, the opposite second clip ends being mirror images of one another, a pair of second flanges, and a pair of pawls extending from the arms at the opposite ends of the second clip, the pawls facing opposite directions;
   the first and second flanges overlapping and retentively engaging one another to attach the handle to the door panel;
   the pawls engaging the pawl stops to prevent sliding movement in opposite directions of the handle on the door panel;
   the second clip being centrally mounted between the opposite handle ends; and
   the second clip being assembled onto the first clip from either of the first clip ends, whereby the handle is mountable to the panel from two opposite directions.

2. The door assembly of claim 1 wherein the pawls are spring biased toward the second clip so as to retain the pawls in engagement with the pawl stops.

3. The door assembly of claim 1 wherein the first clip has a leg extending into the door panel.

4. The door assembly of claim 1 wherein the first flanges are curved from end to end.

5. The door assembly of claim 4 wherein the curved first flanges define a cam surface for increasing pressure between the first and second flanges as the first and second flanges move into overlapping engagement.

6. The door assembly of claim 1 wherein the first flanges are L-shaped and turn outwardly and the second flanges turn inwardly.

7. A door assembly, comprising:
   a door panel;
   a door handle having opposite ends;
   a first clip with a longitudinal axis and opposite ends, the first clip secured to the door panel and positioned between the door panel and the door handle;
   a second clip secured centrally between the opposite ends of the door handle and positioned between the door panel and the door handle, the second clip having a base, with a pair of flexible inclined arms extending outwardly in opposite directions defining from the base, and symmetrical opposite ends;
   the clips having first retentively engaging portions to preclude movement of the handle away from the panel;

the clips being separate from and not integrally formed with the handle and the first clip having opposing pawls extending from the end of each arm and the second clip having pawl stops to engage the pawls to preclude sliding of the handle along the panel;

the handle being reversibly mounted to the door panel in two orientations; and the second clip being bidirectionally mountable in opposite longitudinal directions to the first clip from either end of the first clip until the pawls and pawl stops engage one another.

8. The door assembly of claim 7 wherein the first engaging portions include flanges on the first and second clips which overlap one another.

9. The door assembly of claim 7 wherein the first clip has a leg extending into the door panel.

10. The door assembly of claim 7 wherein at least one of the first engaging portions is ramped so as to provide increased pressure between the first portions as the handle is slid into position on the door panel.

11. The door assembly of claim 1 wherein the second clip has a longitudinal axis and a transverse axis and is symmetrical about the transverse axis.

12. The door assembly of claim 1 wherein the handle has opposite ends and opposite edges extending between the ends and the second clip being mountable on the first clip in two orientations so that the handle ends and edges are reversible with respect to the door panel.

13. The door assembly of claim 1 wherein the second clip is reversibly mountable on the first clip.

14. The door assembly of claim 1 wherein the handle is reversibly mounted to the panel.

15. The door assembly of claim 7 wherein the ends of the second clip are mirror images of one another.

16. The door assembly of claim 7 wherein the handle is reversible 180° with respect to the door panel.

17. The door assembly of claim 7 wherein the second clip is reversible 180° with respect to the first clip.

* * * * *